United States Patent Office 3,411,658
Patented Nov. 19, 1968

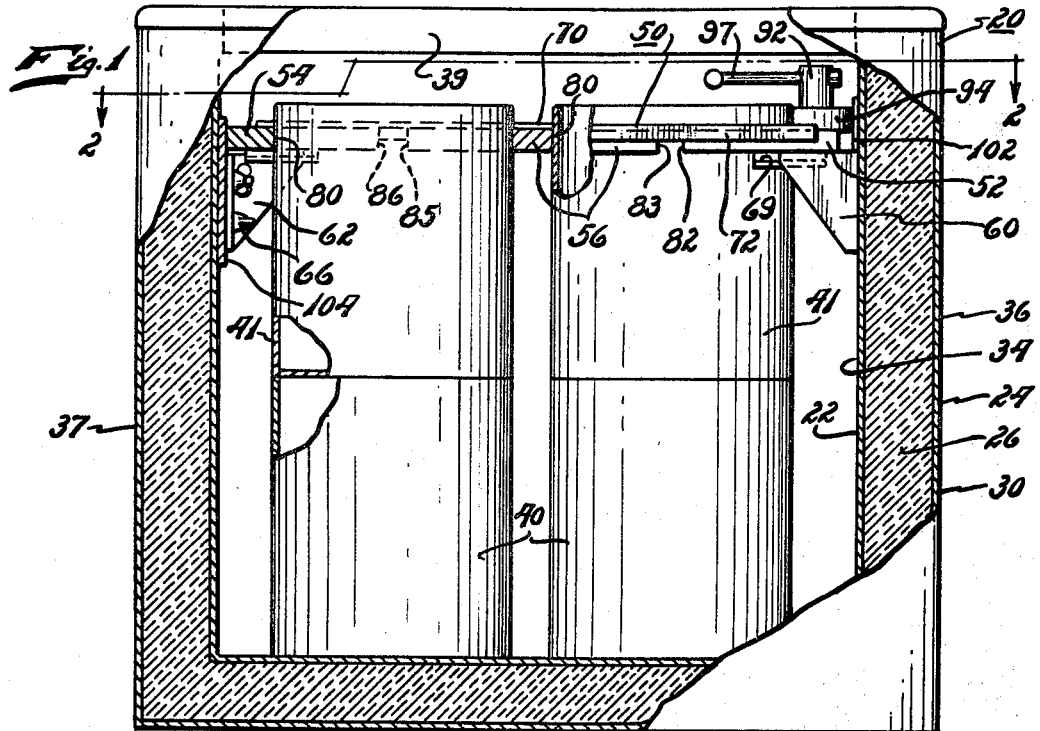
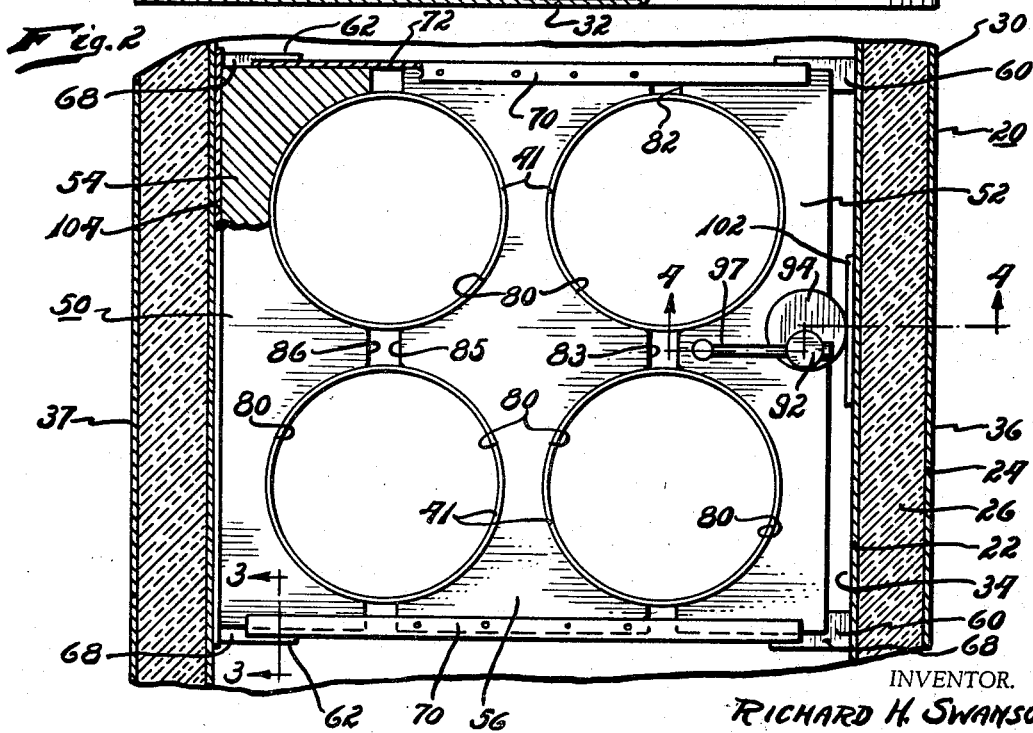

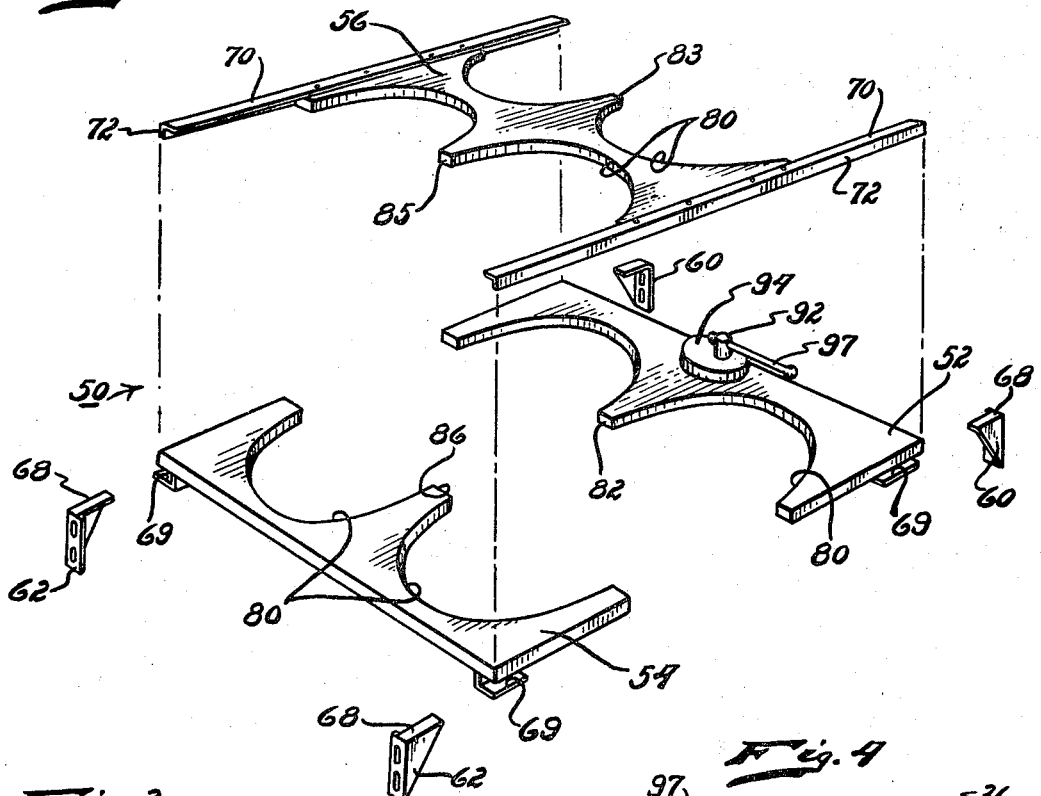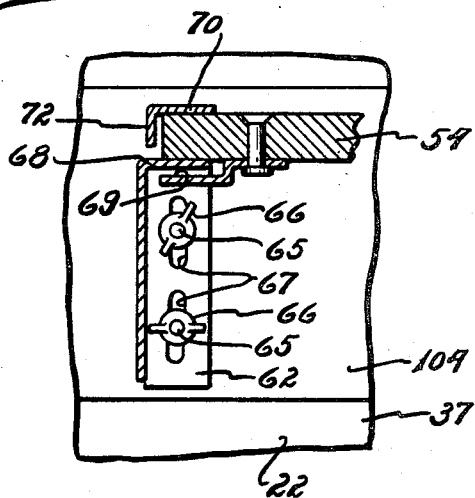

3,411,658
CONTAINER CLAMPING ASSEMBLY
Richard H. Swanson, Manitowoc, Wis., assignor, by mesne assignments, to Kelvinator, Inc., Cleveland, Ohio, a corporation of Delaware
Filed Apr. 13, 1967, Ser. No. 630,652
8 Claims. (Cl. 220—15)

ABSTRACT OF THE DISCLOSURE

A clamping assembly holding containers adjacent an access opening of a compartment and comprising coextending planar bodies each being recessed in complement to the recess of an adjacent body to form spaced apart reception areas each to receive a respective container. The clamping is effected by wedging the bodies together between the compartment walls in its planar arrangement and clamping the containers thereby.

---

This invention relates, generally, to a clamping assembly for at least one and as much as a plurality of containers.

More particularly, the present invention pertains to a clamping assembly adapted for a refrigerated storage compartment to fixedly hold one or a plurality of containers containing articles of food, such as ice cream, sherbets or the like, in a position in relation and adjacent to the access opening of the compartment so that the contents of each container are readily and easily accessible. It is an object of the present invention to provide a clamping assembly for fixedly holding one or a plurality of containers in a spaced relationship relative to a supporting structure and in close proximity but not in contact with respect to one another.

Another object of the present invention is to provide a clamping assembly for fixedly holding one or a plurality of containers and which assembly is so constituted and arranged that it is readily adapted to be mounted and readily used within a compartment or readily disassembled and removed therefrom.

Another object of the present invention is to provide a clamping assembly with a manually operable arrangement and without the use of any implemental aids it is readily operable to receive one or a plurality of containers, simply and easily clamped thereby or released.

Another object of the present invention is to constitute and arrange a clamping assembly which may be readily disassembled, easily and quickly removed from the compartment for washing, sterilizing or the like, and easily, quickly remounted and assembled therewithin for use, without the need of any mounting implements, such as tools.

Another object of the present invention is to constitute and arrange a clamping assembly for a plurality of containers wherein each container is individually embraced by a substantial clamping encirclement to equally distribute the pressure force therearound.

These and other objects and advantages to be gained in practice of this invention will be better understood and further appreciated upon the reading of the following specification having reference to the accompanying drawings.

In the drawings:

FIG. 1 is a vertical end view of an insulated frozen food cabinet with parts broken away and parts shown in section illustrating a plurality of containers fixedly positioned therewith by a clamping assembly, partially broken away and partially shown in section, constructed in accordance with my invention;

FIG. 2 is a fragmentary sectional view taken along line 2—2 of FIG. 1;

FIG. 3 is a fragmentary enlarged view taken along line 3—3 of FIG. 2;

FIG. 4 is a fragmentary enlarged view taken along line 4—4 of FIG. 2;

FIG. 5 is an exploded perspective view of my clamping assembly wherein the parts are illustrated in their relative position for assembly and use.

Referring to the drawing, there is shown an open top refrigerator cabinet, designated in general by a numeral 20, comprising an inner liner 22 spaced from an enclosed by an outer shell 24 between which is placed suitable heat insulation material 26 to form insulated vertical walls 30 joined by a bottom wall 32 enclosing a chamber or compartment 34. The walls 30 as shown and described will hereinafter be referred to as the opposed side walls 36, 37 as opposed to the end walls which are not shown as they neither form nor serve any particular part with the present invention.

The top of the cabinet is open, as at 39, for access to the compartment 34. The opening may, if desired, be closed by any suitable cover member or lid (not shown).

The compartment 34 is preferably of a size to receive for storage one or more conventional, generally, cylindrical containers 40 arranged to be stacked vertically within the compartment so that the top containers 41 are accessible to dispense therefrom the contents contained therein. In this connection the compartment is suitably refrigerated by a refrigerating unit. The refrigerating unit is not shown, nor described, as this is well known and any commercially available unit may be used.

The containers, for which my clamping assembly, identified in general by the numeral 50, is particularly adapted for use, are preferably and generally formed of heavy cardboard material and are packed or filled with frozen food products, preferably in bulk form, such as ice cream, sherbets, frozen confections of various kinds and flavors.

It is a general practice to stack such containers within a refrigerated compartment with the top container being in an accessible position for direct dispensing of the contents, as by spooning. It is a further practice to sometimes exchange positions in the stack whereby an emptied container will be inserted below with a new filled container at the top in dispensing position. The stacking arrangement is not particularly desirable when the product is overly frozen or hardened to make dispensing by spooning difficult, requiring the operator first to dig and soften the product. When a digging action is required the container must be held by the user to prevent toppling and under these conditions injury can often be done to the container therebeneath which may contaminate its contents. My clamping assembly is adapted to fixedly hold the top row of containers in position of access for dispensing and to relieve the bearing load upon the containers therebeneath as well as preventing the transmission of pressure applied to the top container from being transmitted to the container or containers therebeneath.

The clamping assembly 50 comprises planar members or bodies 52, 54, 56 in a coextending planar arrangement supported in a horizontal plane within the compartment 34 by brackets 60 arranged along the wall 36 and by brackets 62 arranged in opposed relation on the opposite wall 37.

The brackets 60, 62 are secured to each respective wall in the same manner. Studs 65 are secured in the respective walls to receive thereon respective brackets 60, 62 which are then secured by wing nuts 66. Each bracket is formed with slots 67 through which the studs 65 extend to permit each bracket to being vertically adjusted on the wall so that its top supporting surface, formed by flange 68, may be readily aligned in a horizontal plane with the other brackets.

The body 52 is slidably supported on the brackets 60 while the body 54 is positioned in opposed relation and slidably supported on the brackets 62. Each body is formed with channels 69 adapted to receive a respective flange 68 of a respective bracket. The channels are formed to extend longitudinally along the ends of the bodies whereby the flanges 68 will guide or track the respective bodies for movement towards or away from each other.

The body 56 is positioned intermediate the bodies 52, 54 and is supported thereby in the same plane for movement therebetween. Rails 70 extend outwardly from the body 56 in opposed direction therefrom to extend over and upon the adjacent body 52 and 54. As the rails 70 merely rest upon the surface of the adjacent bodies 52, 54, being secured only to the body 56 by screws, rivets and the like, the bodies are movable relative to each other. To limit and guide their movement in a linear direction towards or away from each other, each rail is formed with a downwardly extended flange 72 to extend as a guide rail longitudinally along a respective edge of the bodies 52, 54. The flanges 72 are in parallel arrangement with each other.

Cutouts or recesses 80 are formed in each of the bodies 52, 54, 56. The recesses in the body 52 are arranged in spaced apart relation along the side edge 82 and are opposite and in complement with the recesses along the facing edge 83 of the body 56. The recesses are similarly arranged in the body 56 and 54 along their facing edges 85, 86 respectively. Each pair of opposing recesses forms a respective opening 87 to receive therein a respective container.

The recesses 80 are contoured to conform about a peripheral section of a received container. It is obvious that the recesses should be formed to fit the contour of the received container and they are here shown as being semi-circular to embrace a peripheral section of the cylindrical container 41. The embracement of each container is less than full encirclement, that is, the facing edges of the embracing bodies remain in spaced apart relationship.

Journaled in bearing 93 formed in the body 52 is a shaft 92. The shaft 92 is extended for keying thereto cams 94, 96 and a handle 97. The cams are arranged to be on opposite sides of the body 52 and to being rotated in unison against the vertical wall 36.

In use the bodies 52, 54 are rested upon their respective brackets and by flanges 68 engaging respective channels 69, are guided towards the adjacent walls. The body 54 is rested in abutment against the vertical wall 37. The body 56 is next assembled therebetween and with each container 41 received in a respective opening 87. Each top container 41 is preferably rested or stacked upon other containers to place it in alignment and be receivable between the bodies for clamping thereby. The cams 94, 96 are manually rotated to cam against the wall 36 applying pressure in a direction to move the body 52 towards the other bodies. As the body 54 abuts the opposite wall 37 the bodies become wedged in coextending planar arrangement between the vertical walls fixedly holding the containers. The cams will maintain the holding position until manually rotated to release position. In the wedging action sufficient frictionally binding action is applied upon the shaft 92 to prevent free rotation.

To remove an empty container the operator reversely rotates the shaft and the cams thereby which releases the applied pressure to permit separation of the bodies.

If desired, wear plates 102 may be affixed to the vertical wall 36 against which the cams may operate and similarly wear plate 104 upon the wall 37 against which the body 54 rests. The wear plate 104 may be arranged as shims between the brackets 62 and wall to facilitate aligning the clamping assembly over the stacked containers.

Although I have shown and described my clamping device with containers that are short enough and adapted to being stacked within the compartment 34 it is readily apparent that the clamping device is readily adapted and adjustable to other compartments with taller and non-stackable type of containers.

I claim:

1. A clamping assembly for fixedly positioning at least one or a plurality of containers in spaced relation between opposed walls of a compartment comprising:

a pair of flat planar bodies arranged in co-extending relationship between said opposed walls of said compartment;

support means secured to at least one of said walls to support said bodies in co-extending planar relation and at least one of said bodies being slidable thereon in the plane of said support and the other fixedly held thereon;

means for guiding said slidable body towards and away from said other body;

recesses formed in complementary arrangement along the adjoining edges of said bodies adapted to form at least one reception area each to receive therein a respective container;

means operable to draw said bodies into clamping engagement upon containers positioned therebetween; and said operable means being associated with the movable body and operable for engagement against one of said walls to apply a pressure force in a direction towards said fixedly held body to clamp thereby containers positioned therebetween.

2. The clamping assembly of claim 1, including:

said recesses being arranged in spaced apart relation along one edge of said body and being in opposed complementary relation to recesses along the adjacent edge of the opposed body to form a plurality of spaced apart reception areas to receive therein a respective container to be peripherally engaged by the bodies.

3. A clamping assembly for fixedly positioning at least one or a plurality of containers in spaced apart relation and in spaced relation between opposed walls of a compartment comprising:

a plurality of flat planar bodies in co-extending relation between said vertical walls including a first body, a second body and a third body intermediate said first and second body, support means in opposed relation on said opposed walls for slidably supporting in a horizontal plane said first and second body for movement laterally to said walls, means affixed to one of said bodies and extended therefrom to said other bodies to guide said bodies in movement toward or away from each other and to slidably support said third body in the plane of support of said other bodies, recesses arranged in the opposed adjoining edges of said first and third and second and third bodies, said recesses being in complementary arrangement between said first and third and second and third bodies to cooperatively form a plurality of reception areas each to receive therein and substantially encircle in engagement the periphery of a respective container, and means affixed for movement on one of said bodies and being operable to move against one of said walls to apply a pressure force in a direction therefrom to wedge said bodies in co-extending planar relation between said walls effecting a clamping engagement on said containers positioned between said bodies.

4. A clamping assembly to fixedly position at least one or a plurality of containers in spaced relation relative to each other and to opposed vertical walls of a supporting structure comprising:

a plurality of flat planar bodies in co-extending relation between said vertical walls including a first body arranged to being adjacent one of said walls, a second body positioned adjacent the opposing wall and a third body interposed in alignment between said first and second bodies, means for slidably supporting said first and second bodies, said support means being affixed to said walls and being arranged to support said bodies for movement in the same plane between said walls, said third body having oppositely outwardly extending arms for engagement respectively with the adjacent first and second bodies to being slidably supported thereby for movement of said bodies relative to each other, said bodies having recesses formed along adjoining edges in complementary arrangement to cooperatively form a plurality of reception areas between said first and third bodies, and said second and third bodies, and each of said areas being adapted to receive a respective container, means operable for wedging said bodies in co-extending planar alignment between said walls and effect clamping thereby of the containers positioned therebetween.

5. The clamping assembly of claim 4 including:

said wedging means including a member eccentrically journaled to one of said bodies, operable means to rotate said eccentric member into engagement with an adjacent vertical wall.

6. The clamping assembly of claim 4, including:

guide means affixed to said first and second bodies and being in engagement with said support means to guide the sliding movement of said first and second bodies towards and away from each other.

7. The clamping assembly of claim 5, including:

said support means being a pair of bracket members, means for securing said bracket members to a respective wall and at least one of said bracket members being slotted for vertical adjustment on said means to align said bracket members to support said bodies in co-extending planar relation.

8. A clamping assembly to fixedly position at least one or a plurality of containers in spaced relation relative to each other and to opposed vertical walls of a supporting structure comprising:

a plurality of clamping bodies, comprising a first and second body opposed to opposite faces of a third body positioned intermediate said first and second body, means slidably supporting said bodies between the limits of said walls, means for guiding the movements of said bodies in a linear direction towards each other or in opposed direction, said bodies each being formed to engage peripheral proportional sections of respective containers positioned between said bodies and each container engagement of one body being complementary with an engagement of an opposing body to effect a substantial encirclement thereof by the opposing bodies, and means operable from one of said bodies against a vertical wall to apply a pressure force to move said body towards the opposite vertical wall and effect thereby a clamping of said other bodies therebetween and about said containers.

References Cited

UNITED STATES PATENTS

| 2,117,992 | 5/1938 | Pool | 220—15 |
| 2,283,813 | 5/1942 | Kreiling | 220—15 |
| 2,295,609 | 9/1942 | Shimon | 220—15 |
| 2,483,038 | 9/1949 | Curtis | 220—15 X |

THERON E. CONDON, *Primary Examiner.*

J. R. GARRETT, *Assistant Examiner.*